US010739874B2

(12) United States Patent
Bakken et al.

(10) Patent No.: US 10,739,874 B2
(45) Date of Patent: Aug. 11, 2020

(54) TIMING SYNCHRONIZATION OF ACTIVE STYLUS AND TOUCH SENSOR

(71) Applicant: Wacom Co., Ltd., Saitama (JP)

(72) Inventors: Vemund Bakken, Menlo Park, CA (US); Eivind Holsen, Trondheim (NO)

(73) Assignee: Wacom Co., Ltd., Saitama (JP)

(*) Notice: Subject to any disclaimer, the term of this patent is extended or adjusted under 35 U.S.C. 154(b) by 0 days.

(21) Appl. No.: 16/594,977

(22) Filed: Oct. 7, 2019

(65) Prior Publication Data

US 2020/0033965 A1    Jan. 30, 2020

Related U.S. Application Data

(63) Continuation of application No. 16/417,101, filed on May 20, 2019, now Pat. No. 10,437,356, which is a continuation of application No. 16/252,111, filed on Jan. 18, 2019, now Pat. No. 10,296,110, which is a continuation of application No. 15/676,620, filed on Aug. 14, 2017, now Pat. No. 10,185,413, which is a continuation of application No. 14/275,462, filed on May 12, 2014, now Pat. No. 9,733,731.

(51) Int. Cl.
*G06F 3/0354* (2013.01)
*G06F 3/044* (2006.01)
*G06F 3/041* (2006.01)

(52) U.S. Cl.
CPC .......... *G06F 3/03545* (2013.01); *G06F 3/044* (2013.01); *G06F 3/0416* (2013.01); *G06F 2203/04108* (2013.01)

(58) Field of Classification Search
CPC .................................................. G06F 3/03545
See application file for complete search history.

(56) References Cited

U.S. PATENT DOCUMENTS

| | | | |
|---|---|---|---|
| 7,663,607 | B2 | 2/2010 | Hotelling et al. |
| 7,864,503 | B2 | 1/2011 | Chang |
| 7,875,814 | B2 | 1/2011 | Chen et al. |
| 7,920,129 | B2 | 4/2011 | Hotelling et al. |
| 8,031,094 | B2 | 10/2011 | Hotelling et al. |
| 8,031,174 | B2 | 10/2011 | Hamblin et al. |

(Continued)

FOREIGN PATENT DOCUMENTS

WO    2012/129247 A2    9/2012

OTHER PUBLICATIONS

Bakken et al., "Timing Synchronization of Active Stylus and Touch Sensor," Response to Non-Final Rejection, filed Mar. 28, 2017, for U.S. Appl. No. 14/275,462, 12 pages.

(Continued)

*Primary Examiner* — Robin J Mishler
(74) *Attorney, Agent, or Firm* — Seed IP Law Group LLP

(57) ABSTRACT

In one embodiment, a computer-readable non-transitory storage medium embodies logic that is configured when executed to determine a first correlation between first consecutive edges of a synchronization signal and a pre-determined coefficient vector. The logic is further configured when executed to determine a second correlation between second consecutive edges of the synchronization signal and the pre-determined coefficient vector and synchronize one or more timings for communication between a stylus and a device based at least in part on the first and second correlations.

20 Claims, 6 Drawing Sheets

(56) References Cited

U.S. PATENT DOCUMENTS

| | | |
|---|---|---|
| 8,040,326 B2 | 10/2011 | Hotelling et al. |
| 8,049,732 B2 | 11/2011 | Hotelling et al. |
| 8,179,381 B2 | 5/2012 | Frey et al. |
| 8,217,902 B2 | 7/2012 | Chang et al. |
| 8,723,824 B2 | 5/2014 | Myers et al. |
| 2008/0309635 A1 | 12/2008 | Matsuo |
| 2009/0315854 A1 | 12/2009 | Matsuo |
| 2012/0242588 A1 | 9/2012 | Myers et al. |
| 2012/0242592 A1 | 9/2012 | Rothkopf et al. |
| 2012/0243151 A1 | 9/2012 | Lynch |
| 2012/0243719 A1 | 9/2012 | Franklin et al. |
| 2013/0076612 A1 | 3/2013 | Myers |
| 2015/0256329 A1* | 9/2015 | Cheong .............. G06F 3/03545 375/371 |
| 2016/0070374 A1* | 3/2016 | Hamaguchi ......... G06F 3/03545 345/174 |

OTHER PUBLICATIONS

Lynch, "Electronic Devices With Convex Displays," U.S. Appl. No. 61/454,950, filed Mar. 21, 2011, 28 pages.

Myers et al., "Electronic Devices With Concave Displays," U.S. Appl. No. 61/454,936, filed Mar. 21, 2011, 23 pages.

Non-Final Rejection, dated Oct. 28, 2016, for U.S. Appl. No. 14/275,462, Bakken et al., "Timing Synchronization of Active Stylus and Touch Sensor," 7 pages.

Notice of Allowance, dated Apr. 12, 2017 for U.S. Appl. No. 14/275,462, Bakken et al., "Timing Synchronization of Active Stylus and Touch Sensor," 8 pages.

Rothkopf et al., "Electronic Devices With Flexible Displays," U.S. Appl. No. 61/454,894, filed Mar. 21, 2011, 41 pages.

* cited by examiner

TIMING SYNCHRONIZATION OF ACTIVE STYLUS AND TOUCH SENSOR

BACKGROUND

Technical Field

This disclosure generally relates to touch sensors and styluses.

Description of the Related Art

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DETAILED DESCRIPTION

Figure 1:
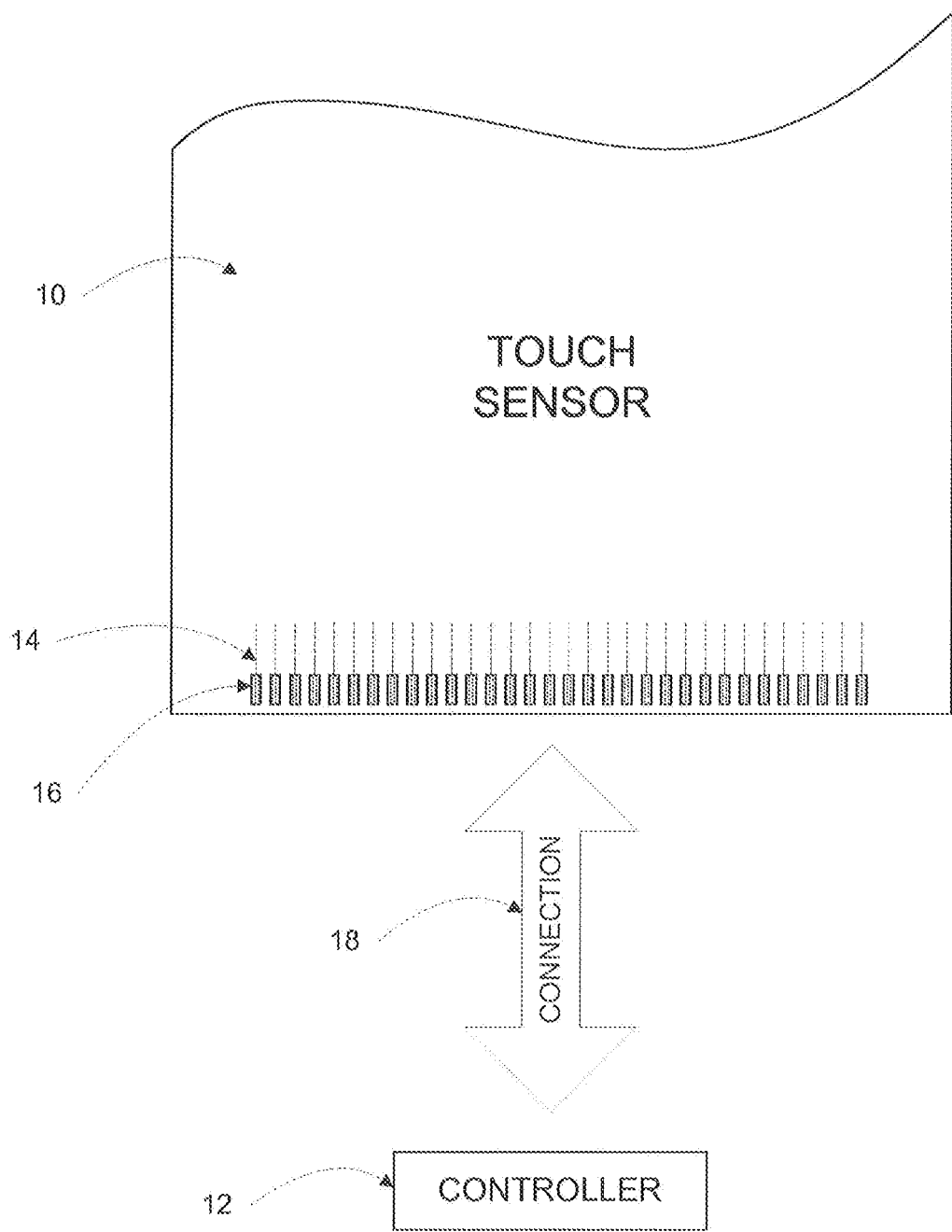
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined, amount, As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing where appropriate.

In particular embodiments, one or more drive electrodes may together form a drive electrode line running horizontally or vertically or in any suitable orientation. Similarly, one or more sense electrodes may together form a sense electrode line running horizontally or vertically or in any suitable orientation. Additionally, one or more ground electrodes may together form a ground electrode line running horizontally or vertically or in any suitable orientation. In particular embodiments, drive electrode lines may run substantially perpendicular to sense electrode lines. In particular embodiments, drive electrode lines may run substantially parallel to sense electrode lines. Herein, reference to a drive electrode line may encompass one or more drive electrodes making up the drive electrode line, and vice versa, where appropriate. Similarly, reference to a sense electrode line may encompass one or more sense electrodes making up the sense electrode line, and vice versa, where appropriate. Additionally, reference to a ground electrode line may encompass one or more ground electrodes making up the ground electrode line, and vice versa, where appropriate. In particular embodiments, any electrode may be configured as a drive, sense, or ground electrode and the configuration of any electrode may be changed during operation of touch sensor 10. In particular embodiments, configuration of electrodes may be controlled by touch-sensor controller 12.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

In particular embodiments, touch sensor 10 may determine the position of an object (such as a stylus or a user's finger or hand) that makes physical contact with a touch-sensitive area of touch sensor 10. In addition or as an alternative, in particular embodiments, touch sensor 10 may determine the position of an object that comes within proximity of touch sensor 10 without necessarily contacting touch sensor 10. In particular embodiments, an object may come within proximity of touch sensor 10 when it is located some distance above a surface of touch sensor 10; when it hovers in a particular position above a surface of touch sensor 10; when it makes a motion (such as for example a swiping motion or an air gesture) above a surface of touch sensor 10; or any suitable combination of the above. In particular embodiments, determining the position of an object that comes within proximity of touch sensor 10 without making physical contact may be referred to as determining the proximity of an object. In particular embodiments, determining the proximity of an object may comprise determining the position of an object's projection onto touch sensor 10 when the object is located some distance above a plane of touch sensor 10. The projection of an object onto touch sensor 10 may be made along an axis that is substantially orthogonal to a plane of touch sensor 10. In particular embodiments, the position of an object's projection onto touch sensor 10 may be referred to as the position or the location of an object. As an example and not by way of limitation, touch sensor 10 may determine the position of an object when the object is located above the surface of touch sensor 10 and within a distance of approximately 20 mm of the surface of touch sensor 10. Although this disclosure describes or illustrates particular touch sensors 10 that may determine a position of physical contact of an object, a proximity of an object, or a combination of the two, this disclosure contemplates any suitable touch sensor 10 suitably configured to determine a position of physical contact of an object, a proximity of an object, or any suitable combination of one or more of the above.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g., at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground electrode lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
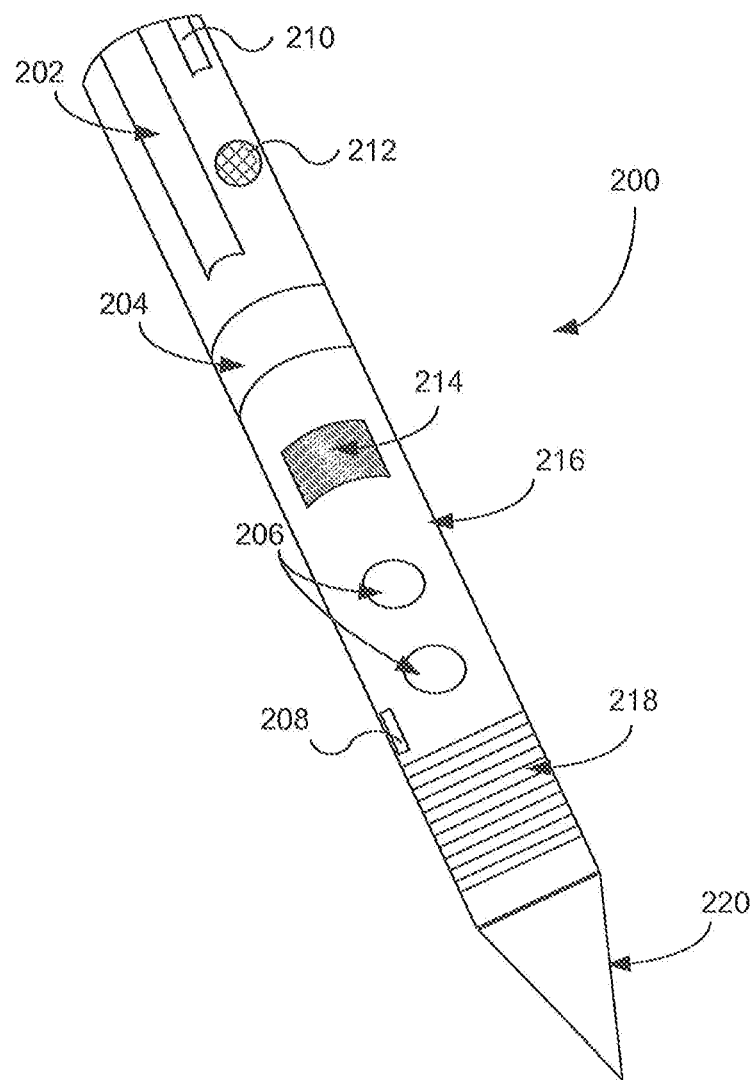
FIG. 2 illustrates an example active stylus exterior.

FIG. 2 illustrates an example exterior of active stylus 200, which may be used in conjunction with touch sensor 10 of FIG. 1. The active stylus 200 may be powered by an internal or external power source. Active stylus 200 may provide touch or proximity inputs to a touch sensor, such as touch sensor 10 of FIG. 1. As an example of FIG. 2, active stylus 200 may include external components such as buttons 206, slider 202 and slider 204 that are integrated with outer body 216. Herein, reference to an active stylus may encompass one or more of a button and one or more of a slider, where appropriate. Such external components may provide for interactions between active stylus 200 and example device 42 of FIG. 4, between active stylus 200 and a user, or between device 42 and the user. As an example and not by way of limitation, interactions may include communication between active stylus 200 and device 42, enabling or altering one or more functionalities of active stylus 200 or device 42, or providing feedback to or accepting input from one or more users. Furthermore, outer body 216 may have any suitable dimensions and made of any suitable material or combination of materials, such as for example and without limitation, plastic or metal. Device 42 may be any suitable device such as a desktop computer, laptop computer, tablet computer, personal digital assistant (PDA), smartphone, satellite navigation device, portable media player, portable game console, kiosk computer, point-of-sale device, or other suitable device. Although this disclosure illustrates and describes particular components configured to provide particular interactions, this disclosure contemplates any suitable components configured to provide any suitable interactions. As an example and not by way of limitation, external components (such as for example buttons 206 or slider 202) of active stylus 200 may interact with one or more internal components of active stylus 200. As another example and not by way of limitation, the external components may provide for one or more interactions with one or more devices 42 or other active styluses 200.

As described above, actuating one or more particular external components may initiate an interaction between active stylus 200 and device 42, between active stylus 200 and the user, or between device 42 and the user. Particular external components such as buttons 206 and sliders 202-204 may be mechanical or capacitive. The particular external components may function as rollers, trackballs, or wheels. As an example and not by way of limitation, slider 202 may function as a vertical slider that is aligned along a latitudinal axis of active stylus 200. As another example and not by way of limitation, slider 204 may function as a wheel that is aligned along a circumference of active stylus 200. Capacitive sliders 202-204 and buttons 206 may be implemented using one or more touch-sensitive areas. The touch-sensitive areas may have any suitable shapes, dimensions, or locations. Furthermore, the touch-sensitive areas may be made from any suitable materials. As an example and not by way of limitation, each touch-sensitive area may be implemented using flexible mesh of electrically-conductive materials. As another example and not by way of limitation, each touch-sensitive area may be implemented using an FPC.

Active stylus 200 may have one or more components configured to provide feedback to or accept feedback from the user. Feedback may include, and not limited to, tactile, visual, or audio feedback. Furthermore, active stylus 200 may include grooves 218 on its outer body 216. Grooves 218 may have any suitable dimensions. Grooves 218 may be located at any suitable area on outer body 216 of active stylus 200. Grooves 218 may enhance a user's grip on outer body 216 of active stylus 200. Grooves 218 may also provide tactile feedback to, or accept tactile input from a user. Active stylus 200 may include audio component 212 capable of transmitting and receiving audio signals. As an example and not by way of limitation, audio component 212 may contain a microphone capable of recording or transmitting voices of a user. As another example and not by way of limitation, audio component 212 may provide an auditory indication of a power status of active stylus 200. Active 200 may also include visual feedback component 210. As an example and not by way of limitation, visual feedback component 210 may be a light-emitting diode (LED) indicator or an electrophoretic display. As another example and not by way of limitation, visual feedback component 210 may indicate a power status of active stylus 200. Herein, reference to an active stylus may include one or more of an audio component 212 and one or more of a visual feedback component 210, where appropriate.

In the example of FIG. 2, surface 214 may be modified. Accordingly, modified surface 214 of active stylus 200 may possess properties that are different from rest of outer body 216. As an example and not by way of limitation, modified surface 214 may have a different texture, temperature, or electromagnetic characteristic from the rest of outer body 216. Modified surface 214 may form one or more components on outer body 216. Modified surface 214 may also be capable of dynamically altering one or more properties. Furthermore, the user may interact with modified surface 214 to provide a particular interaction. As an example and not by way of limitation, dragging a finger across modified surface 214 may initiate a data transfer between active stylus 200 and device 42.

One or more components of active stylus 200 may be configured to communicate data between active stylus 200 and device 42. As an example of FIG. 2, active stylus 200 may include tip (or nib) 220. Tip 220 may include one or more electrodes configured to communicate data between active stylus 200 and one or more devices or other active styluses. As another example and not by way of limitation, the electrodes of active stylus 200 may reside on its outer body 216 or any other suitable part of active stylus 200. In particular embodiments, tip 220 may provide or communicate pressure information (for example, an amount of pressure being exerted by active stylus 200 through tip 220) between active stylus 200 and device 42 or other active stylus. Tip 220 may be made of any suitable material (for example an electrically conductive material) and possess any suitable dimension (for example a diameter of 1 mm or less at its terminal end). In the example of FIG. 2, active stylus 200 may include port 208 at any suitable location on outer body 216. Port 208 may be configured to transfer signals or information between active stylus 200 and one or more devices 42 via, for example, wired coupling. Port 208 may also transfer signals or information by any suitable technology, such as for example universal serial bus (USB) or Ethernet. Although this disclosure describes and illustrates particular stylus comprising particular configuration of particular components having particular locations, dimensions, compositions, and functionalities, this disclosure contemplates any suitable stylus comprising any suitable configuration of any suitable components having any particular locations, dimensions, compositions, and functionalities.

Figure 3:
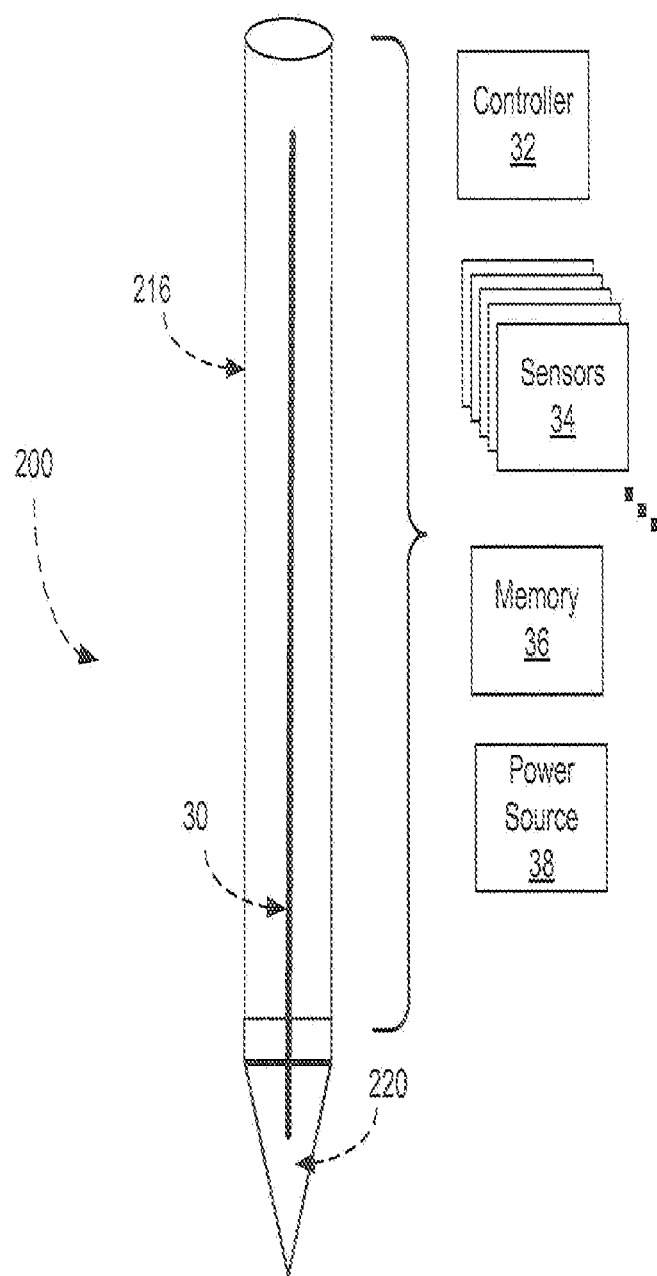
FIG. 3 illustrates an example active stylus interior.

FIG. 3 illustrates example internal components of active stylus 200. Active stylus 200 may include controller 32, one or more sensors 34, memory 36, and power source 38.

Herein, reference to an active stylus may comprise one or more of a controller, one or more of a sensor, one or more of a memory, and one or more of a power source, where appropriate. Accordingly, controller 32, sensors 34, memory 36, and power source 38 may form internal components of active stylus 200. In particular embodiments, one or more of the internal components may be configured to provide an interaction between active stylus 200 and example device 42 of FIG. 4, between active stylus 200 and a user, or between device 42 and the user. In other particular embodiments, one or more of the internal components, in conjunction with one or more of the external components as described above, may be configured to provide an interaction between active stylus 200 and device 42, active stylus 200 and the user, or between device 42 and the user. As an example and not by way of limitation, interactions may include communication between active stylus 200 and device 42, enabling (or altering) functionality of active stylus 200 (or device 42), or providing feedback to (or accepting input from) one or more users. As another example and not by way of limitation, active stylus 200 may communicate via any suitable short distance, low energy data transmission or modulation link (for example, radio frequency (RF) communication link). Accordingly, active stylus 200 may include a RF device for transmitting data over the RF link.

Controller 32 may be a controller or any other type of suitable computing device (or processor) configured for operating active stylus 200. Controller 32 may be an integrated circuit (IC) such as, for example, general-purpose microprocessor, microcontroller, programmable logic device (PLD), programmable logic array (PLA), or ASIC. Furthermore, controller 32 may include one or more of a processor unit, one or more of a drive unit, one or more of a sense unit, and one or more of a storage unit. The processor unit in controller 32 may operate one or more electrodes in active stylus 200. The drive unit may supply signals to one or more electrodes of tip 220 via center shaft 30. The drive unit may also supply signals to operate a plurality of sensors 34 or one or more external components of active stylus 200. In particular embodiments, the drive unit of active stylus 200 may be configured to transmit a signal detectable by electrodes of touch sensor 10 of device 42. As an example and not by way of limitation, the drive unit may include a voltage pump or a switch. The voltage pump may generate a high voltage signal. The switch may toggle the potential of tip 220 between GND voltage and one or more pre-determined voltage levels. Furthermore, the drive unit may transmit a signal that may be sensed by the electrodes of touch sensor 10. As an example and not by way of limitation, the signal may be a square wave, a sine wave, or any suitable digital-logic signal. The drive unit may transmit the signal to the electrodes of touch sensor 10 by applying a voltage or a current to electrodes of tip 220 that may remove charge from or add charge to the electrodes of tip 220.

The sense unit of active stylus 200 may sense signals received by the one or more electrodes of tip 220 through center shaft 30. Furthermore, the sense unit may provide measurement signals to the processor unit representing input from device 42. The sense unit may sense signals generated by sensors 34 or one or more external components and provide measurement signals to the processor unit representing input from the user. The processor unit may operate the supply of signals to the electrodes of tip 220 and process measurement signals from the sense unit to detect and process input from device 42. The processor unit may also process measurements signals from sensors 34 or one or more external components. The storage unit may store programming instructions for execution by the processor unit. The instructions may control the drive unit to supply signals to the electrodes of tip 220, process measurement signals from the sense unit corresponding to input from device 42, process measurement signals from sensors 34 or external components to initiate a pre-determined function or gesture to be performed by active stylus 200 or device 42, or electronically filter signals received from the sense unit, where appropriate. Although this disclosure describes and illustrates particular controller with particular components having particular implementations, this disclosure contemplates any suitable controller with any suitable components having any suitable implementations in any suitable manner.

As an example and not by way of limitation, sensors 34 may include touch sensors, gyroscopes, accelerators, contact sensors, or any suitable types of sensors. Sensors 34 may detect or measure data about the environment in which active stylus 200 operates. Sensors 34 may also detect and measure one or more characteristics of active stylus 200, such as acceleration, movement, orientation, contact, pressure on outer body 216, force on tip 220, vibration, or any suitable characteristics of active stylus 200. As an example and not by way of limitation, sensors 34 may be implemented mechanically, electronically, or capacitively. As described above, data detected and measured by sensors 34 (as communicated to controller 32) may initiate a pre-determined function or gesture performed by active stylus 200 or device 42. In particular embodiments, data detected or received by sensors 34 may be processed by controller 32 and stored in memory 36. Memory 36 may be any suitable form of memory suitable for storing such data in active stylus 200. Memory 36 may also store programming instructions for execution by the processor unit of controller 32. Controller 32 may also access data stored in memory 36.

Power source 38 may be any suitable source of stored energy including but not limited to electrical and chemical-energy sources. Such power source may be suitable for operating active stylus 200. Power source 38 may be an alkaline battery or a rechargeable battery. As an example and not by way of limitation, the rechargeable battery may be a lithium-ion battery, a nickel-metal-hydride battery. Power source 38 may also be charged by energy from a user or device 42. As an example and not by way of limitation, power source 38 may be charged by motion induced on active stylus 200. Power source 38 of active stylus 200 may provide power to or receive power from the device 42 or any other suitable external power source. As an example and not by way of limitation, energy may be inductively transferred from power source 38 and a power source of the device or any other suitable external power source (for example a wireless power transmitter). Power source 38 may also receive its power by a wired connection through an applicable port coupled to a suitable external power supply.

Figure 4:
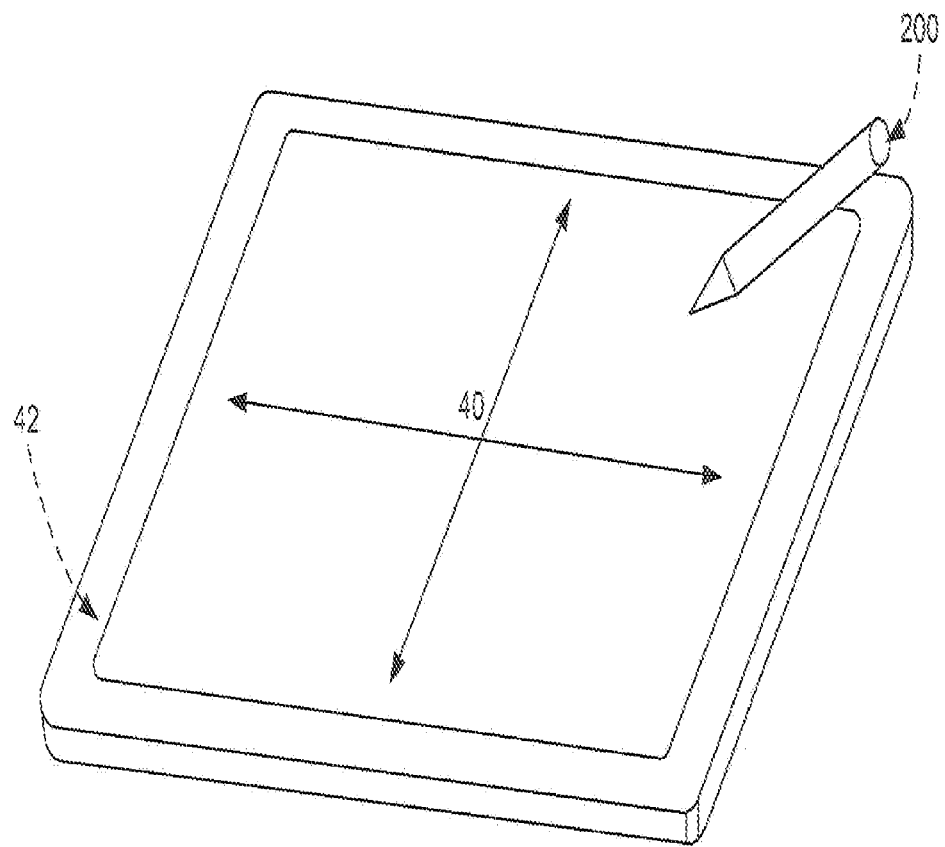
FIG. 4 illustrates an example active stylus with an example device.

FIG. 4 illustrates example active stylus 200 with example device 42. Device 42 may be a touch screen. Device 42 may have a display (not shown) and a touch sensor 10 with a touch-sensitive area 40. The display may be a liquid crystal display (LCD), a light-emitting diode (LED) display, a LED-backlight LCD, or other suitable display. Furthermore, the display may be visible through a cover panel and one or more substrates (with the drive and sense electrodes that are disposed on the one or more substrates) of device 42. Although this disclosure describes and illustrates particular display with particular touch sensor, this disclosure contemplates any suitable display with any suitable touch sensor.

Device 42 may include electronics that provide one or more functionalities. As an example and not by way of limitation, device 42 may me include circuitry or any other suitable electronics for wireless communication to or from device 42, executing programs on device 42, generating graphical or other user interfaces (UIs) for device 42 to display to a user, managing power to device 42 from a battery or other suitable power sources, recording multimedia content, any other suitable functionality, or any suitable combination of these. Although this disclosure describes and illustrates particular electronics of particular touch-sensing device providing particular functionalities, this disclosure contemplates any suitable electronics of any suitable touch-sensing device providing any suitable functionalities.

Active stylus 200 and device 42 may be synchronized prior to communication of data between active stylus 200 and device 42. As an example and not by way of limitation, active stylus 200 may be synchronized to device 42 through a pre-determined bit sequence transmitted by touch sensor 10 of device 42. As another example and not by way of limitation, active stylus 200 may be synchronized to device 42 by processing a drive signal transmitted by one or more electrodes of touch sensor 10 of device 42. As yet another example and not by way of limitation, active stylus 200 may be synchronized to device 42 through a pre-determined bit sequence transmitted by active stylus 200. Active stylus 200 may also interact or communicate with device 42 when it is brought in contact with or in proximity to touch-sensitive area 40 of touch sensor 10. Such interaction between active stylus 200 and device 42 may be capacitive or inductive. When active stylus 200 is bought in contact with or in the proximity of touch-sensitive area 40 of touch sensor 10, signals generated by active stylus 200 may influence capacitive nodes within touch-sensitive area 40. Although this disclosure describes and illustrates particular interactions between particular stylus and particular touch-sensing device via particular means, this disclosure contemplates any suitable interactions between any suitable stylus and any suitable touch-sensing device via any suitable means.

One or more measurement signals from one or more sensor 34 of active stylus 200 may initiate, provide for, or terminate interactions between active stylus 200 and one or more devices 42 or one or more users, as described above. Accordingly, interaction between active stylus 200 and device 42 may occur when active stylus 200 is contacting or in proximity to device 42. As an example and not by way of limitation, a user may perform a gesture or sequence of gestures, such as shaking or inverting active stylus 200, whilst active stylus 200 is hovering above touch-sensitive area 40 of device 42. Based on the one or more gestures performed, active stylus 200 may interact with device 42 to initiate a pre-determined function. The pre-determined function may be authenticating a user associated with active stylus 200 or device 42. Although this disclosure describes and illustrates particular interactions between particular stylus and particular touch-sensing device, this disclosure contemplates any suitable interactions in any suitable manner.

Active stylus 200 may receive signals from external sources, including but not limited to device 42, a user, or another active stylus. Active stylus 200 may encounter noise when receiving the signals. Noise may be introduced into the signals via sources including but not limited to data quantization, limitations of position-calculation algorithms, bandwidth limitations of measurement hardware, accuracy limitations of analog front-ends of active stylus 200, physical layout of the system, touch sensor 10, charger of active stylus 200, display of device 42, circuitry of active stylus 200, or any suitable external noise. Noise external to active stylus 200 may have frequency characteristics covering a wide range of the frequency spectrum that includes narrow-band and wide-band noises.

A signal may be received by one or more electrodes capable of sensing signals in active stylus 200. Such electrodes may reside on tip 220 of active stylus 200. The signal as received by the electrodes may be transmitted to controller 32. In particular embodiments, the signal may be transmitted to controller 32 via center shaft 30. Controller 32 may include the drive unit, the sense unit, the storage unit, and the processor unit, as described above. The signal, as received, may be amplified by any suitable amplifier that includes but not limited to a digital or an analog amplifier. The signal, as received, may also be filtered by any suitable filter that includes but not limited to a digital or an analog filter. Device 42 may transmit data to active stylus 200 by sending data to one or more drive electrodes of touch sensor 10. Accordingly active stylus 200 may receive data via electrodes of tip 220. After active stylus 200 and device 42 are synchronized, active stylus 200 may transmit data to device 42 by performing charge addition to or charge removal from one or more sense electrodes of touch sensor 10, and device 42 may receive data transmitted from active stylus 200 by sensing data with one or more sense electrodes of touch sensor 10.

Prior to communication of data from active stylus 200 to touch-sensor controller 12 of device 42, timing used by active stylus 200 to transmit data and timing used by touch-controller 12 to receive data may not be synchronized. Similarly, prior to communication of data from touch-sensor controller 12 to active stylus 200, timing used by touch sensor controller 12 to transmit data and timing used by active stylus 200 to receive data may not be synchronized. As an example and not by way of limitation, one of the timings may be out of phase with respect to another. As another example and not by way of limitation, both timings may have substantially different frequencies. As such, data communication may not take place between touch-controller 12 and active stylus 200. In order for effective data communication to take place between active stylus 200 and device 42, the respective timings of active stylus 200 and touch-controller 12 may need to converge or synchronize, at least with regards to frequency and phase. Once the respective timings have been synchronized, reliability of data transmission between active stylus 200 and touch-controller 12 may then be further improved. As an example and not by way of limitation, active stylus 200 may estimate a time taken to transmit initial synchronization data from touch-controller 12 to active stylus 200 and use the estimated time taken to reliably transmit data back to touch-controller 12. Furthermore, once timings of both active stylus 200 and touch-sensor controller 12 have been synchronized, a lock may be obtained on the timings used for future data transmission between active stylus 200 and touch-sensor controller 12, even under noisy conditions.

Timing used to transmit data may be sourced from one or more clocks. Clocks may be used to communicate between active stylus 200 and touch-sensor controller 12, and to coordinate activities between active stylus 200 and touch-sensor controller 12. Clocks on active stylus 200 and touch-sensor controller 12 may be subject to multiple factors that may cause one clock to vary with respect to the other. Even between two identical active styluses 200, factors such as power level, voltage level, operating temperature, integrated circuit (IC) process corner may cause one clock to vary with respect to another. Moreover, timing as sourced from each clock may include jitter that causes data rate, duty cycle, or even phase to vary from one cycle to another. Such jitter may result in variation of at least a frequency or a phase of any nominal timing used to transmit and receive data by active stylus 200 or touch-sensor controller 12. As an example and not by way of limitation, a signal used to transmit data from touch-sensor controller 12 to active stylus 200 with a nominal data rate of 50 kHz may include jitter that causes the data rate to vary between approximately 48 kHz and 52 kHz. Sources of the jitter may include impedance mismatch, power-supply noise, and ground noise that are picked up by the signal. Although this disclosure describes particular clocks and particular timings sourced from the particular clocks, this disclosure contemplates any suitable clocks and any suitable timings sourced from the clocks.

In particular embodiments, the signal as transmitted between active stylus 200 and touch-sensor controller 12 may include digital logic with two-level symbols or multi-level symbols (for example, tri-level logic). As an example and not by way of limitation, a signal utilizing two-level digital logic symbols may be a periodic series of alternating logic highs and logic lows. Each logic high and logic low may be associated with particular voltage amplitude. As an example and not by way of limitation, a logic high signal may be associated with voltage amplitude of 1.8V and a logic low signal may be associated with voltage amplitude of 0V. In particular embodiments, logic high and logic low may be referred to, respectively, as "one and zero", "on and off" or "pulse and off". A transition from logic low to logic high may be indicated by a rising (or positive) edge. In contrast, a transition from logic high to logic low may be indicated by a failing (or negative) edge. Although this disclosure describes particular signal between particular stylus and particular touch-sensor controller in particular manner, this disclosure contemplates any suitable signal between any suitable stylus and any suitable touch-sensor controller in any suitable manner.

Prior to communication of data between active stylus 200 and touch-sensor controller 12 of device 42, active stylus 200 (or touch-sensor controller 12) may perform a synchronization routine. The synchronization routine may be used to synchronize transmitter timing and corresponding receiver timing between active stylus 200 and touch-sensor controller 12, as described above. As an example and not by way of limitation, prior to the start of data transfer from active stylus 200 to touch-sensor controller 12, touch-sensor controller 12 may transmit to active stylus 200 a synchronization timing signal comprising a particular frequency, a particular phase, and a particular duty cycle. The synchronization timing signal may run over multiple periods of a clock of touch-sensor controller 12. As such, the synchronization timing signal may comprise a series of rising and falling edges occurring at particular times. As another example and not by way of limitation, touch-sensor controller 12 may also transmit to active stylus 200 a signal embedding synchronization data that repeats at regular pre-determined time intervals. That signal may also run over multiple periods of the clock. As an example of the two-level digital logic signal and not by way of limitation, the synchronization data may comprise a pre-determined pattern of alternating "ones and zeroes" (for example, a SYNC) repeating at regular tune intervals within the signal. As such, the signal may again comprise a series of rising and falling edges occurring at particular times, albeit in a different pattern from that of the synchronization timing signal as described above.

Active stylus 200 may process either the synchronization timing signal or the signal embedding synchronization data as received from touch-sensor controller 12 to determine one or more synchronization parameters for synchronizing and locking on to timings between active stylus 200 and touch-sensor controller 12. The synchronization parameters may include particular characteristics of the synchronization signal, such as for example data rate, frequency, period, duty cycle, or phase. As an example of FIG. 5 and not by way of limitation, controller 32 of active stylus 200 may comprise correlator 502 that compares the synchronization timing signal (or signal embedding synchronization data) with a known vector to determine the synchronization parameters. The synchronization parameters may be used by controller 32 of active stylus 200 to synchronize receiver timing of active stylus 200 with transmitter timing of touch-sensor controller 12 and subsequently obtain a lock on transmission timing for sending data from active stylus 200 to touch-sensor controller 12. Thereafter, active stylus 200 may be synchronized with device 42, and active stylus 200 may communicate with device 42 by sending or receiving data in a manner consistent with the synchronization parameters. In particular embodiments, a data signal as transmitted by active stylus 200 or device 42 may share similar characteristics with the synchronization timing signal (or signal embedded with the synchronization data). After obtaining the one or more synchronization parameters, active stylus 200 may transmit a signal to touch-sensor controller 12 of device 42 by performing charge removal from or charge addition to electrodes of touch sensor 10 at a timing substantially equivalent to that of the synchronization timing signal (or signal embedding synchronization data). Although this disclosure describes a particular mariner of timing synchronization between particular stylus and particular touch-sensor controller, this disclosure contemplates any suitable timing synchronization between any suitable stylus and any suitable touch-sensor controller.

In particular embodiments, the synchronization timing signal (or signal embedded with synchronization data) may be a voltage signal received at an electrode of active stylus 200 from touch sensor 10 of device 42. A sense signal representing a current sinked by a sense unit of active stylus 200 may result from receipt of the voltage signal. Active stylus 200 may convert the sense signal into a voltage signal that is proportional to the sense signal. As an example and not by way of limitation, the sense signal may be passed through an electronic gain stage, a buffer stage, or a transimpedance amplifier stage that produces an output voltage signal whose amplitude is proportional to the sense signal. The sense signal may also be passed through a filter to remove unwanted noise or transients at particular frequencies. Although this disclosure describes particular signals for synchronization in a particular manner and occurring in particular sequence, this disclosure contemplates any suitable signals for synchronization in any suitable manner and in any suitable sequence.

Active stylus 200 may perform the synchronization routine in the presence of noise. As an example and not by way of limitation, the synchronization timing signal (or signal embedding synchronization data) may include a series of repetitive square waves combined with noise. As another example of the two-level digital logic signal and not by way of limitation, noise may manifest in the form of spikes that distort the periodic and digital logic signal embedding synchronization data to such an extent that rising and falling edges may not be distinguishable. Furthermore noise may be caused at least by clock jitter resulting in varying data rate, duty cycle, and phase from one clock cycle to another, as described above. Noise may also be injected from external environment, such as for example battery charger or liquid-crystal display (LCD) panel of device 42. Such noise may potentially cause active stylus 200 and touch-sensor controller 12 to lose their mutual timing synchronization, and break current data communications. Although this disclosure describes particular manner of losing synchronization between particular stylus and particular touch-sensor controller 12, this disclosure contemplates any suitable manner of losing synchronization between any suitable stylus and any suitable touch-sensor controller.

Figure 5:
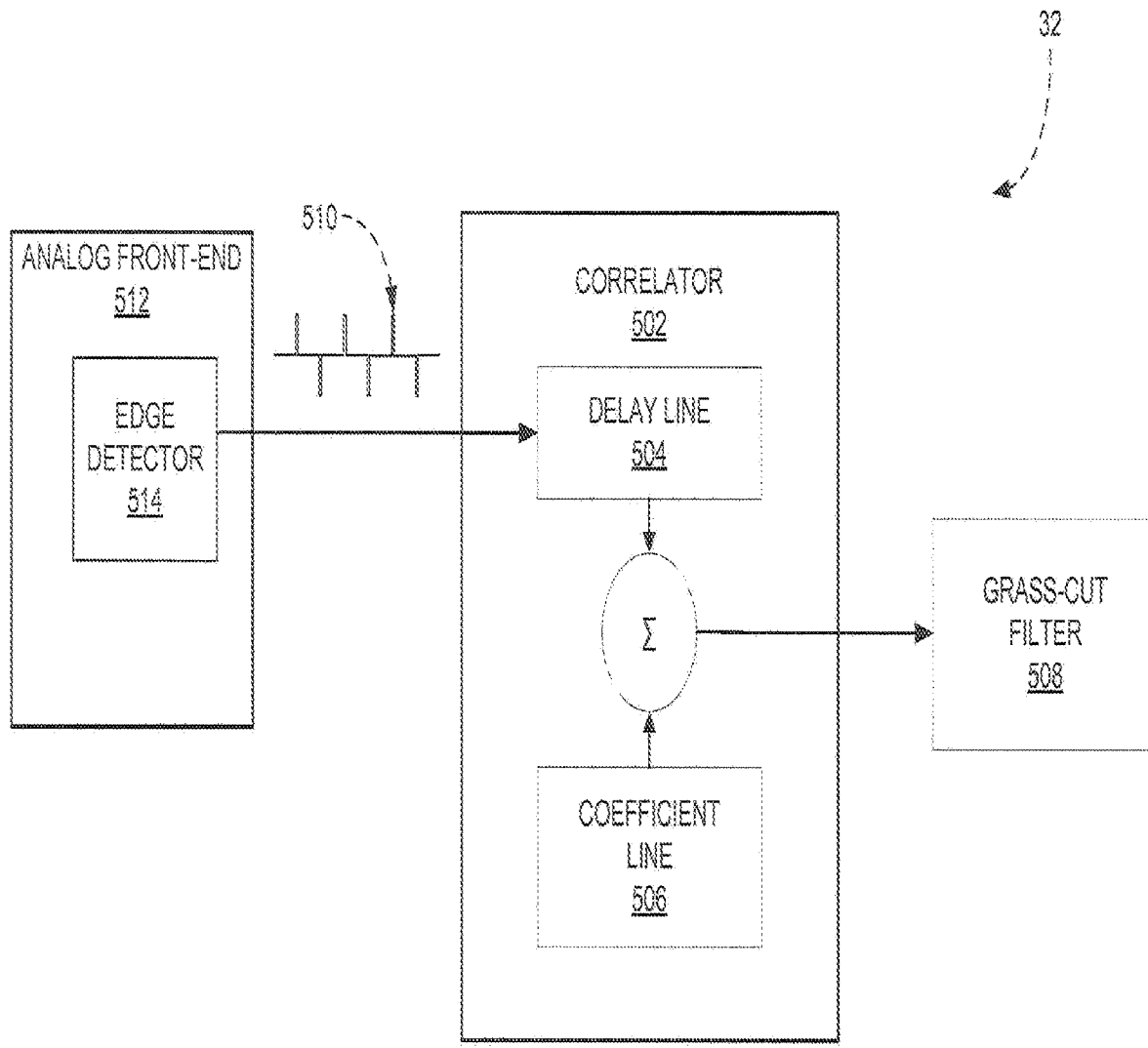
FIG. 5 illustrates an example controller of FIG. 3 for timing synchronization.

FIG. 5 illustrates an example controller 32 for timing synchronization. In the example of FIG. 5, analog front-end (AFE) 512 of controller 32 receives one or more synchronization signals from touch-sensor controller 12, converts the synchronization signals into a sequence of digital signals 510 representing detected rising and falling edges (from each synchronization signal), and transmits the sequence of digital signals 510 to correlator 502 for timing synchronization. As an example and not by way of limitation, the synchronization signals may be embedded within one or more sense signals transmitted from touch sensor 10 of device 42 and received by electrodes of tip 220 through center shaft 30, as described above. As another example and not by way of limitation, the synchronization signals may be received from touch-sensor controller 12 via any suitable wireless communication technologies between active stylus 200 and device 42, such as for example BLUETOOTH and WI-FI. Hence when active stylus 200 is within communication range of device 42, controller 32 may receive and process the synchronization signals. When active stylus 200 is beyond communication range of device 42, controller 32 may not reliably receive the synchronization signals, hence interrupting the synchronization routine. The synchronization signals may include noise as described above. Therefore, at least one of the detected edges being transmitted to correlator 502 may be noise. Furthermore, AFE 512 may include an edge detector 514 to detect rising and falling edges from each received synchronization signal, and provide the sequence of digital signals 510. As an example and not by way of limitation, edge detector 514 may comprise a 2-bit comparator with rising-edge and falling-edge detections. Based on a sampling frequency of controller 32, edge detector 514 may detect whether rising or falling edge occurs at particular times within each received synchronization signal according to the sampling frequency. A rising edge as detected may be register as signal "1" by edge detector 514 and a falling edge as detected may be registered as signal "−1". When no edges are detected, edge detector 514 registers signal "0". Although this disclosure describes and illustrates particular controller of particular stylus for receiving and processing particular signals for timing synchronization from particular touch-sensor controller in particular manner, this disclosure contemplates any suitable controller of any suitable stylus for receiving and processing any suitable signals for timing synchronization from any suitable touch-sensor controller in any suitable manner. Furthermore, although this disclosure describes and illustrates particular stylus initiating particular timing synchronization routine by receiving and processing particular synchronization signals from particular touch-sensor controller, this disclosure contemplates the touch-sensor controller initiating the timing synchronization routine by receiving and processing the synchronization signals from the stylus as well.

In the example of FIG. 5, correlator 502 includes delay line 504 and coefficient line 506 to obtain timing synchronization and lock between active stylus 200 and touch-sensor controller 12. The sequence of digital signals 510 comprising detected edge data is fed into delay line 504 for correlation with a pre-determined vector of coefficient line 506. A data correlator performing the correlation may utilize modulation technique such as phase-shift keying (PSK), frequency-shift keying (FSK), amplitude-shift keying (ASK), or pulse-width modulation (PDM). In particular embodiments, delay line 504 may be implemented by consecutive storage locations within memory 36 of active stylus 200 represented by a flip-flop chain connected in series. The pre-determined vector of coefficient line 506 comprising positive and negative edge coefficients may be programmable as well. As an example and not by way of limitation, the pre-determined vector of coefficient line 506 comprises expected positive and negative edge coefficients for every clock cycle of the synchronization signal. As an example and not by way of limitation, the pre-determined vector may be programmed to store one or more codes with properties that are related at least to noise margin or the synchronization. An example of a code for a synchronization signal with a single frequency tone may be 100 . . . 00-100 . . . 00100 . . . 00-100 . . . 00100 . . . 00-100 . . . 001. Another example of a code for a synchronization signal that includes a plurality of frequencies may be a wide-band code such as 1000 . . . 00000-100 . . . 00100 . . . 00000-10 . . . 010 . . . 00-1000.

The size of delay line 504 may be programmable. As an example and not by way of limitation, delay line 504 may be programmable for frequency-tuning and for working with different system clocks. As another example and not by way of limitation, the size of delay line 504 may depend on the one or more codes utilized by the synchronization signal and the pre-determined vector of coefficient line 506 as described above. For each and every clock cycle of synchronization signal, delay line 504 stores a sequence of digital signals 510 comprising edge data corresponding the particular clock period of synchronization signal, up to a pre-determined number of delay taps or elements. As an example and not by way of limitation, AFE 512 receives a synchronization signal at a rate of 500 kHz from touch-sensor controller 12. Edge detector 514 of APE 512 may sample the synchronization signal with a sampling frequency of 24 MHz, detect whether an edge (for example, rising or falling edge) occurs at each time instance according to the sampling frequency, and send the sequence of digital signals 510 comprising the rising and falling edge data to delay line 504 of correlator 502. A four-period delay line 504 with a correlation depth of four may comprise up to 192 delay taps (or elements) where each delay tap (or element) has a value of "1" (corresponding to a rising edge), "−1" (corresponding to a falling edge), or "0" (no edge), The 192 delay taps (or elements) store 192 consecutive time instances of edge data from the sequence of digital signals 510. In particular embodiments, the maximum number of delay taps or elements within delay line 504 may depend at least on a number of clock periods that may be stored by delay line 504, a sampling frequency of controller 32, and the data transmission rate of the synchronization signal. Furthermore, for every clock cycle of the synchronization signal, delay line 504 may discard the oldest period of 48 taps (or elements) of edge data and retrieve a new period of 48 taps (or elements) of edge data from edge detector 514.

Based on the 24 MHz sampling frequency and 500 kHz synchronization signal, a coefficient vector may comprise a pre-determined pattern of 48 coefficients per period for a total of pre-determined 192 coefficients corresponding to the four-period delay line as described above. As an example and not by way of limitation, the pre-determined coefficients may comprise one or more SYNCs pattern of coefficients. For every clock cycle of synchronization signal till end of the synchronization routine, correlator 502 compares contents of delay line 504 (a.k.a. delay taps or elements) with the pre-determined vector of coefficient line 506 to generate a correlation output. As such, the sequence of digital signals 510 slides through delay line 504 and correlation with the pre-determined vector of coefficient line 506 may be determined for each clock cycle. When high correlation has been achieved between the sequence of digital signals 510 (as provided by the synchronization signal) and pre-determined coefficient vector of coefficient line 506 over one or more consecutive clock cycles, timings of both active stylus 200 and touch-sensor controller 12 (for used in mutual data communication) may be synchronized. As an example and not by way of limitation, accurately tracking SYNCs within the sequence of digital signals 510 may improve a signal-to-noise ratio between active stylus 200 and touch-sensor controller 12. For multiple high correlations, each time difference between particular occurrences of high correlation may be used to improve accuracy in the synchronization routine. As an example and not by way of limitation, each time difference may be used by controller 32 to determine timing for sending a response back to touch-sensor controller 12 from active stylus 200. Although this disclosure describes and illustrates particular analog front-end for detecting rising and falling edges of particular signal from particular touch-sensor controller in particular manner, this disclosure contemplates any suitable analog front-end or one or more suitable components for detecting rising and falling edges of any suitable signal from any suitable touch-sensor controller in any suitable manner. Furthermore, although this disclosure describes and illustrates particular manner of correlating particular sequence of edges with particular coefficients over a plurality of consecutive clock periods of the particular signal using particular components, this disclosure contemplates any suitable manner of correlating any suitable sequence of edges with any suitable coefficients over a plurality of consecutive clock periods of the signal using one or more suitable components.

Noise as described above may add or cancel edges. As an example and not by way of limitation, noise may cause a correlation output to deviate from its expected value (when all edges are detected correctly within the one or more periods). In the example of FIG. 5, grass-cut filter 508 sets a pre-determined threshold for detecting edges (rising or falling) for synchronizing timing between active stylus 200 and touch-sensor controller 12. This may improve synchronization routine in the presence of substantial noise. If the correlation output is above (or equivalent to) the pre-determined threshold, detected edge data within the particular one or more periods digital signals 510 may be correct and used by correlator 502 to synchronize timing. As an example of the above four-period delay and not by way of limitation, if the correlation output is above the pre-determined threshold, the edges as detected within that four periods of synchronization signal may be used by correlation 502 to synchronize timing. In contrast, if the correlation out falls below the pre-determined threshold, the edges as detected within the particular one or more periods of synchronization signal may be discarded. Although this disclosure describes and illustrates particular mariner by particular component to synchronize timing in the presence of noise, this disclosure contemplates any suitable manner by any suitable component to synchronize timing in the presence of noise.

Figure 6:
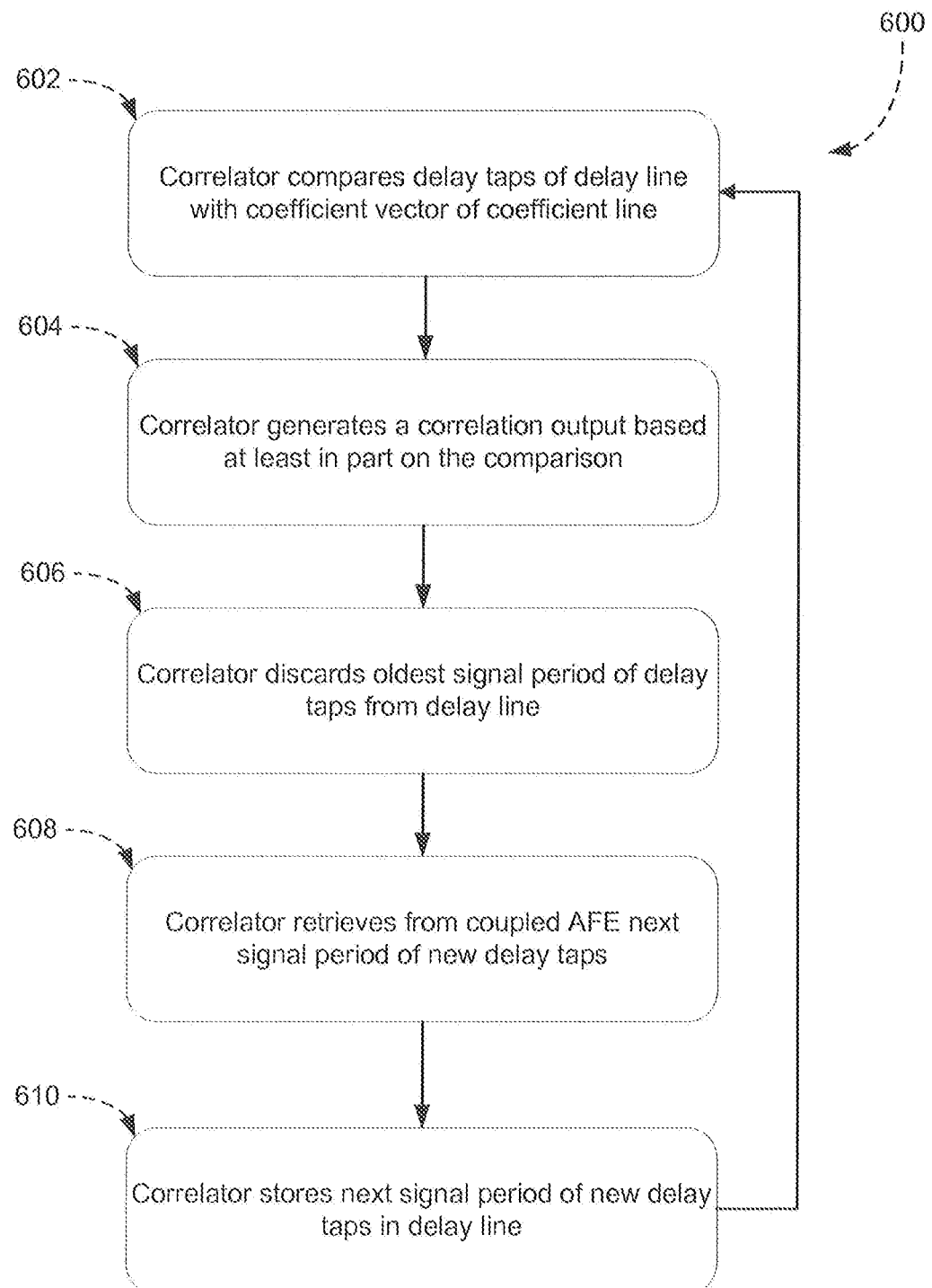
FIG. 6 illustrates an example method for timing synchronization by example controller of FIG. 3.

FIG. 6 illustrates example method 600 for timing synchronization by example controller 32 of FIG. 3. In method 600 of FIG. 6, steps 602-610 may be repeated for each period of the synchronization signal during the synchronization routine. In step 602, correlator 502 compares delay taps (or elements) of delay line 504 with coefficient vector of coefficient line 506, as described above. In step 604, correlator 502 generates a correlation output based at least in part on the comparison, as described above. In step 606, correlator 502 discards oldest signal period of delay taps (or elements) from delay line 504, as described above. In step 608, correlator 502 retrieves from coupled AFE 512 next signal period of new delay taps (or elements), as described above. In step 610, correlator 502 stores next signal period of new delay taps (or elements) in delay line 504. Although this disclosure describes and illustrates particular method for timing synchronization using particular timing elements of particular synchronization signal and particular coefficient vector in particular sequence, this disclosure contemplates any suitable method for timing synchronization using any suitable timing elements of any suitable synchronization signal and any suitable coefficient vector in any suitable sequence. Furthermore, although this disclosure describes and illustrates particular method using particular components for timing synchronization, this disclosure contemplates the particular method using one or more suitable components for timing synchronization.

Herein, reference to a computer-readable non-transitory storage medium or media may include one or more semiconductor-based or other integrated circuits (ICS) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device configured to communicate with a stylus, the device comprising:
   a touch sensor including conductive material forming drive electrodes and sense electrodes; and
   a touch sensor controller, coupled to the drive electrodes and the sense electrodes, and configured to drive the drive electrodes to generate synchronization signals, wherein the synchronization signals include a plurality of frequencies and are generated based on digital data defined by wide-band code,
   wherein the stylus is configured to:
      receive the synchronization signals transmitted from the drive electrodes, and convert the synchronization signals into sequences of digital signals;
      correlate each of the sequences of digital signals with the digital data defined by the wide-band code to generate multiple correlations; and
      synchronize one or more timings for communication with the touch-sensor controller based at least in part on one or more of the multiple correlations.

2. The device according to claim 1, wherein the wideband code includes ones and zeroes with properties that are related at least to noise margin or synchronization.

3. The device according to claim 1, wherein the synchronization signals include a pattern of one of ones and zeroes, highs and lows, or pulses and offs, corresponding to the wide-band code.

4. The device according to claim 1, wherein the synchronization signals include one or more synchronization parameters used by the stylus to lock at least one of the one or more timings.

5. The device according to claim 4, wherein the one or more synchronization parameters include at least one of data rate, frequency, period, duty cycle, or phase of the synchronization signals.

6. The device according to claim 4, wherein the synchronization parameters are used by the stylus to synchronize a receiver timing of the stylus and a transmission timing of the stylus.

7. The device according to claim 1, wherein rising-edges or falling-edges of the synchronization signals are converted into the digital signals corresponding to −1 or +1 for the multiple correlations.

8. A method performed by a touch sensor controller of a device configured to communicate with a stylus, the method comprising:
   driving drive electrodes of a touch sensor coupled to the touch sensor controller to generate synchronization signals, wherein the touch sensor includes conductive material forming the drive electrodes and sense electrodes, and wherein the synchronization signals include a plurality of frequencies and are generated based on digital data defined by wideband code; and
   receiving, from the stylus, signals in response to the synchronization signals, at the sense electrodes of the touch sensor,
   wherein the stylus is configured to:
      receive the synchronization signals transmitted from the drive electrodes, and convert the synchronization signals into sequences of digital signals;
      correlate each of the sequences of digital signals with the digital data defined by the wide-band code to generate multiple correlations; and
      synchronize one or more timings for communication with the touch-sensor controller based at least in part on one or more of the multiple correlations.

9. The method according to claim 8, wherein the wideband code includes ones and zeroes with properties that are related at least to noise margin or synchronization.

10. The method according to claim 8, wherein the synchronization signals include a pattern of one of ones and zeroes, highs and lows, or pulses and offs, corresponding to the wide-band code.

11. The method according to claim 8, wherein the synchronization signals include one or more synchronization parameters used by the stylus to lock at least one of the one or more timings.

12. The method according to claim 11, wherein the one or more synchronization parameters include at least one of data rate, frequency, period, duty cycle, or phase of the synchronization signals.

13. The method according to claim 11, wherein the synchronization parameters are used by the stylus to synchronize a receiver timing of the stylus and a transmission timing of the stylus.

14. The method according to claim 8, wherein rising-edges or falling-edges of the synchronization signals are converted into the digital signals corresponding to −1 or +1 for the multiple correlations.

15. A computer comprising:
   a processor,
   a memory device coupled to the processor;
   a touch sensor configured to communicate with a stylus and including conductive material forming drive electrodes and sense electrodes and; and
   a touch sensor controller couple to the touch sensor and configured to drive the drive electrodes to generate synchronization signals, wherein the synchronization signals include a plurality of frequencies and are generated based on digital data defined by wide-band code,
   wherein the stylus is configured to receive the synchronization signals transmitted from the drive electrodes, convert the synchronization signals into sequences of digital signals, correlate each of the sequences of digital signals with the digital data defined by the wide-band code to generate multiple correlations, and synchronize one or more timings for communication with the touch-sensor controller based at least in part on one or more of the multiple correlations.

16. The computer according to claim 15, wherein the wide-band code includes ones and zeroes with properties that are related at least to noise margin or synchronization.

17. The computer according to claim 15, wherein the synchronization signals include a pattern of one of ones and zeroes, highs and lows, or pulses and offs, corresponding to the wide-band code.

18. The computer according to claim 15, wherein the synchronization signals include one or more synchronization parameters used by the stylus to lock at least one of the one or more timings.

19. The computer according to claim 18, wherein the one or more synchronization parameters include at least one of data rate, frequency, period, duty cycle, or phase of the synchronization signals.

20. The computer according to claim 15, wherein rising-edges or falling-edges of the synchronization signals are converted into the digital signals corresponding to −1 or +1 for the multiple correlations.

* * * * *